(12) United States Patent
Takeuchi et al.

(10) Patent No.: US 9,728,945 B2
(45) Date of Patent: Aug. 8, 2017

(54) PATCH PANEL ASSEMBLY

(71) Applicant: Go!Foton Holdings, Inc., Somerset, NJ (US)

(72) Inventors: Kenichiro Takeuchi, North Brunswick, NJ (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 484 days.

(21) Appl. No.: 14/197,819

(22) Filed: Mar. 5, 2014

(65) Prior Publication Data

US 2014/0262487 A1  Sep. 18, 2014

Related U.S. Application Data

(60) Provisional application No. 61/780,147, filed on Mar. 13, 2013.

(51) Int. Cl.
*H02G 3/04* (2006.01)
*H04Q 1/02* (2006.01)

(52) U.S. Cl.
CPC ............ *H02G 3/0456* (2013.01); *H04Q 1/13* (2013.01)

(58) Field of Classification Search
CPC ........... H02G 3/0456; H02G 3/04; H04Q 1/13
See application file for complete search history.

(56) References Cited

U.S. PATENT DOCUMENTS

| | | | |
|---|---|---|---|
| 2,865,979 | A | 12/1958 | Klassen |
| 4,353,518 | A | 10/1982 | Taylor et al. |
| 4,688,885 | A | 8/1987 | Poteat et al. |
| 5,100,221 | A | 3/1992 | Carney et al. |
| 5,613,021 | A | 3/1997 | Saito et al. |
| 5,775,755 | A | 7/1998 | Covert et al. |

(Continued)

FOREIGN PATENT DOCUMENTS

| | | |
|---|---|---|
| EP | 0207926 A2 | 1/1987 |
| EP | 0795935 A2 | 9/1997 |

OTHER PUBLICATIONS

Partial International Search Report for Application No. PCT/US2013/023176 dated May 2, 2013.

(Continued)

*Primary Examiner* — William H Mayo, III
*Assistant Examiner* — Hiram E Gonzalez
(74) *Attorney, Agent, or Firm* — Lerner, David, Littenberg, Krumholz & Mentlik, LLP (57) ABSTRACT

A cable guide for guidance of at least one cable through a patch panel system, including a housing having front, back, left, and right sides, and at least one patch panel device including a tray and one or more adapters, the cable guide comprising an advancing member having a first end for coupling to the back side of the housing, a second end for coupling to the tray of the patch panel device, and a guide member disposed between the first and second ends, wherein the advancing member is transitionable between a first and second state, wherein, when the first and second ends are coupled respectively to the back side and the tray, in the first state, the guide member is positioned at least partially external to the housing at one of the left or right sides; and in the second state, the guide member is positioned within the housing.

11 Claims, 7 Drawing Sheets

(56) References Cited

U.S. PATENT DOCUMENTS

| | | | |
|---|---|---|---|
| 6,070,742 A * | 6/2000 | McAnally | H05K 7/1491 211/26 |
| 6,263,141 B1 | 7/2001 | Smith | |
| 6,293,707 B1 | 9/2001 | Wild | |
| 6,327,139 B1 * | 12/2001 | Champion | H02B 1/202 174/69 |
| 6,356,697 B1 | 3/2002 | Braga et al. | |
| 6,442,030 B1 | 8/2002 | Mammoser et al. | |
| 6,556,763 B1 | 4/2003 | Puetz et al. | |
| 6,902,069 B2 | 6/2005 | Hartman et al. | |
| 6,925,241 B2 | 8/2005 | Bohle et al. | |
| 7,335,056 B1 | 2/2008 | Clark et al. | |
| 7,352,945 B2 | 4/2008 | Holmberg et al. | |
| 7,460,758 B2 | 12/2008 | Xin | |
| 7,746,667 B1 | 6/2010 | Baiza et al. | |
| 8,068,715 B2 | 11/2011 | Kewitsch | |
| 8,175,425 B2 | 5/2012 | Chen | |
| 8,179,684 B2 | 5/2012 | Smrha et al. | |
| 8,731,361 B2 | 5/2014 | Anderson et al. | |
| 8,939,792 B2 | 1/2015 | Takeuchi et al. | |
| 2002/0117942 A1 * | 8/2002 | Audibert | G02B 6/4455 312/223.1 |
| 2004/0074852 A1 | 4/2004 | Knudsen et al. | |
| 2004/0178312 A1 | 9/2004 | Parsons | |
| 2005/0111809 A1 | 5/2005 | Giraud et al. | |
| 2006/0018622 A1 | 1/2006 | Caveney et al. | |
| 2006/0162948 A1 | 7/2006 | Rinderer et al. | |
| 2007/0096606 A1 | 5/2007 | Ryu | |
| 2007/0189692 A1 | 8/2007 | Zimmel et al. | |
| 2007/0230889 A1 | 10/2007 | Sato et al. | |
| 2008/0002937 A1 | 1/2008 | Spisany et al. | |
| 2008/0205843 A1 | 8/2008 | Castonguay et al. | |
| 2009/0078834 A1 * | 3/2009 | Chen | H01R 9/2416 248/70 |
| 2009/0086441 A1 | 4/2009 | Randall et al. | |
| 2009/0238533 A1 * | 9/2009 | Stansbury | G02B 6/4452 385/135 |
| 2010/0008623 A2 | 1/2010 | Arol et al. | |
| 2010/0054659 A1 | 3/2010 | Pnini et al. | |
| 2010/0248535 A1 | 9/2010 | Chern et al. | |
| 2010/0310221 A1 | 12/2010 | Le Dissez | |
| 2010/0310225 A1 | 12/2010 | Anderson et al. | |
| 2011/0267794 A1 | 11/2011 | Anderson et al. | |
| 2011/0317971 A1 | 12/2011 | Zhang et al. | |
| 2012/0019117 A1 | 1/2012 | Dunwoody et al. | |
| 2012/0321255 A1 | 12/2012 | Kewitsch | |
| 2013/0196538 A1 | 8/2013 | Takeuchi et al. | |
| 2014/0248028 A1 | 9/2014 | Campbell et al. | |
| 2014/0262487 A1 | 9/2014 | Takeuchi et al. | |
| 2014/0348481 A1 | 11/2014 | Giraud et al. | |
| 2014/0354131 A1 | 12/2014 | Takeuchi et al. | |
| 2014/0355217 A1 | 12/2014 | Takeuchi et al. | |
| 2014/0357118 A1 | 12/2014 | Takeuchi et al. | |
| 2015/0253529 A1 | 9/2015 | Lu et al. | |
| 2015/0268436 A1 | 9/2015 | Blackwell, Jr. et al. | |
| 2015/0301298 A1 | 10/2015 | Frith et al. | |
| 2016/0047999 A1 | 2/2016 | Alexi et al. | |

OTHER PUBLICATIONS

International Search Report for Application No. PCT/US2013/023176 dated Jun. 27, 2013.

Partial International Search Report for Application No. PCT/US2013/033701 dated Jul. 11, 2013.

International Search Report and Written Opinion for Application No. PCT/US2013/033701 dated Sep. 2, 2013.

International Search Report and Written Opinion for Application No. PCT/US2014/021953 dated Jun. 25, 2014.

* cited by examiner

PATCH PANEL ASSEMBLY

CROSS-REFERENCE TO RELATED APPLICATIONS

The present application claims the benefit of the filing date of U.S. Provisional Patent Application No. 61/780,147 filed Mar. 13, 2013, the disclosure of which is hereby incorporated herein by reference.

FIELD

The present disclosure generally relates to a device and a system for supporting and managing communication connectors, adapters, and/or ports. More particularly, the present disclosure relates to a communication patch panel device and system, which facilitates access to communication connectors, adapters, and/or ports supported by the device and system.

BACKGROUND

In communications cabinets and racks, a multitude of cables are interconnected to one another through connectors, e.g., adapters. A cable organization unit typically has a tray or a shelf or a similar platform, which supports the connectors, e.g., adapters. Examples of cable organization units include patch panels.

A patch panel houses cable connectors and in the majority of cases is rack-mounted. The patch panel typically is two-sided, where the front of the patch panel provides for connections to relatively short cables and the rear of the patch panel provides for connection to relatively long wires or cables. This setup facilitates the performance of temporary alterations to the front of the patch panel without disturbing the connections in the rear. Sometimes, the cables connected to the front of the patch panel may interconnect different patch panels and may be relatively short or may be a part of longer cables. The patch panel facilitates interconnecting, monitoring, and circuit testing of equipment without necessitating costly switching of equipment.

Early applications for patch panels were for telephone exchanges, where they are still used albeit in a more automated form. Patch panels are also used extensively in the entertainment industry, e.g., in recording and television studios. They are also used in concert halls to manage connections among equipment, e.g., microphones, speakers, and other electronic equipment. Patch panels are valued for such purposes not only for their convenience and relative cost effectiveness, but also because they make it easier to identify problems such as feedback, ground loops, and static.

Traditional fiber optic cable organization units include fiber optic shelves having a single patch panel or multiple modular panels on the front patching side of the shelf. Although the front-facing connections of the patch panel are typically exposed and easy to access, the rearward connections are typically stored within the organization unit. In order to access the rearward connection adapters, the patch panel is pulled proximally from the unit, and is typically pulled almost completely out of the unit in order to provide a technician sufficient space to properly configure, connect, or otherwise work with the cables therein. Accordingly, a relatively large free space must typically be reserved as a workspace proximate an organization unit in cable installations. Thus, it is desirable to provide communication patching systems allowing for improved access to both the front and back adapters of patch panels.

Furthermore, a plurality of patch panels may typically be provided in a housing which arranges the patch panels in vertical alignment through a support means such as a shelf. As a considerable number of cables may be connected to the front and rear adapters of each patch panel therein, the cables may become tangled and disorganized on both ends of the patch panels. As the cables connected to multiple patch panels become tangled with one another, individual patch panels may become difficult to pull from the housing. Additionally, the general disorganization of the cables may cause the differentiation of the cables of one patch panel from another to be unnecessarily troublesome. Thus, it is also desirable to provide communication patching systems allowing for improved organization of the cables connected to the plurality of patch panels provided in a system.

BRIEF SUMMARY

In one embodiment of the present disclosure, a cable guide for a communication patch panel system may include an advancing member having a first end for coupling to a back side of a housing, a second end for coupling to a tray of a patch panel device, and a guide member disposed between the first and second ends, wherein the advancing member is transitionable between a first state and a second state, wherein, when the first and second ends are coupled respectively to the back side and the tray in an installed state, in the first state, the guide member is positioned at least partially external to the housing at one of the left or right sides, and in the second state, the guide member is positioned within the housing.

In another embodiment of the present disclosure, a cable guide for a communication patch panel system may include an arm member including a first section and a second section, the first section for pivotably coupling to a tray, a track for mounting within a housing, the track including a groove extending along the track, the second section for slidably coupling to the track such that the second section is translatable along the groove, and a securing member coupled to the arm member, wherein the arm member is translatable between a first and a second state, wherein, in an installed state where the first section is pivotably coupled to the tray and the second section is slidably coupled to the track, in the first state, the securing member is positioned at least partially external to one of the left or right sides of the housing, and in the second state, the securing member is positioned within the housing.

In another embodiment of the present disclosure, a communication patch panel system may include a housing including a front side, a back side, a left side, and a right side, one or more patch panel devices, each device including a tray, the tray translatable along an axis extending from the front end to the back side of the housing, one or more adapters operatively coupled to the tray, each adapter being operatively connectable to at least one cable, and at least one pole positioned external to the housing, the pole including a substantially hollow interior, the pole being configured to receive at least a length of the at least one cable through the substantially hollow interior.

These and other features of the present disclosure will be more fully described with reference to the accompanying figures.

BRIEF DESCRIPTION OF THE DRAWINGS

By way of description only, embodiments of the present disclosure will be described herein with reference to the accompanying drawings, in which.

DETAILED DESCRIPTION

Particular embodiments of the present disclosure will be described with reference to the accompanying drawings. In the figures and in the description that follow, in which like reference numerals identify similar or identical elements, the term "proximal" will refer to the end of the device that is closest to the operator or user during use, while the term "distal" will refer to the end of the device that is farther from the operator or user during use.

Figure 1A:
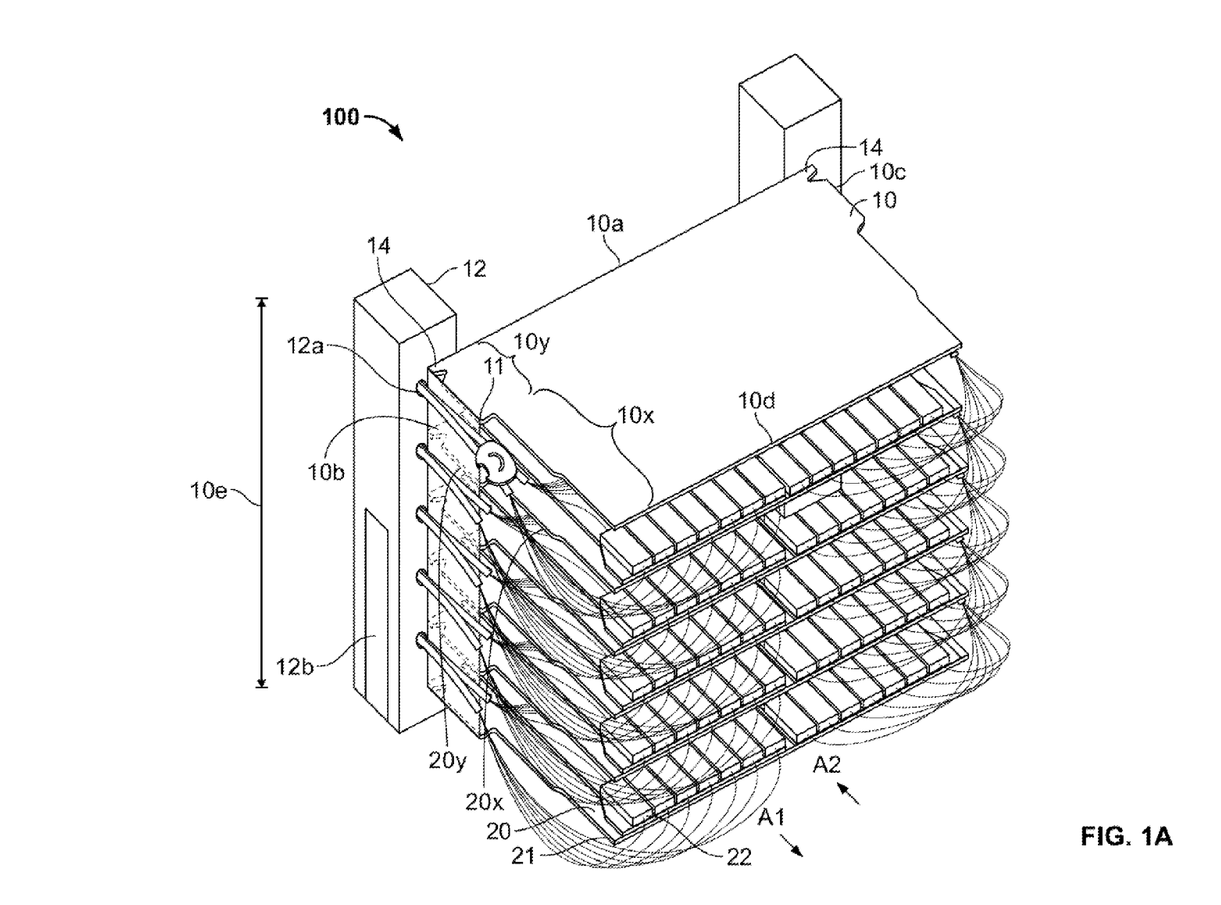
FIG. 1A is a perspective view of a communication patching system including a housing storing multiple patch panel devices and a cable pole.
Figure 1B:
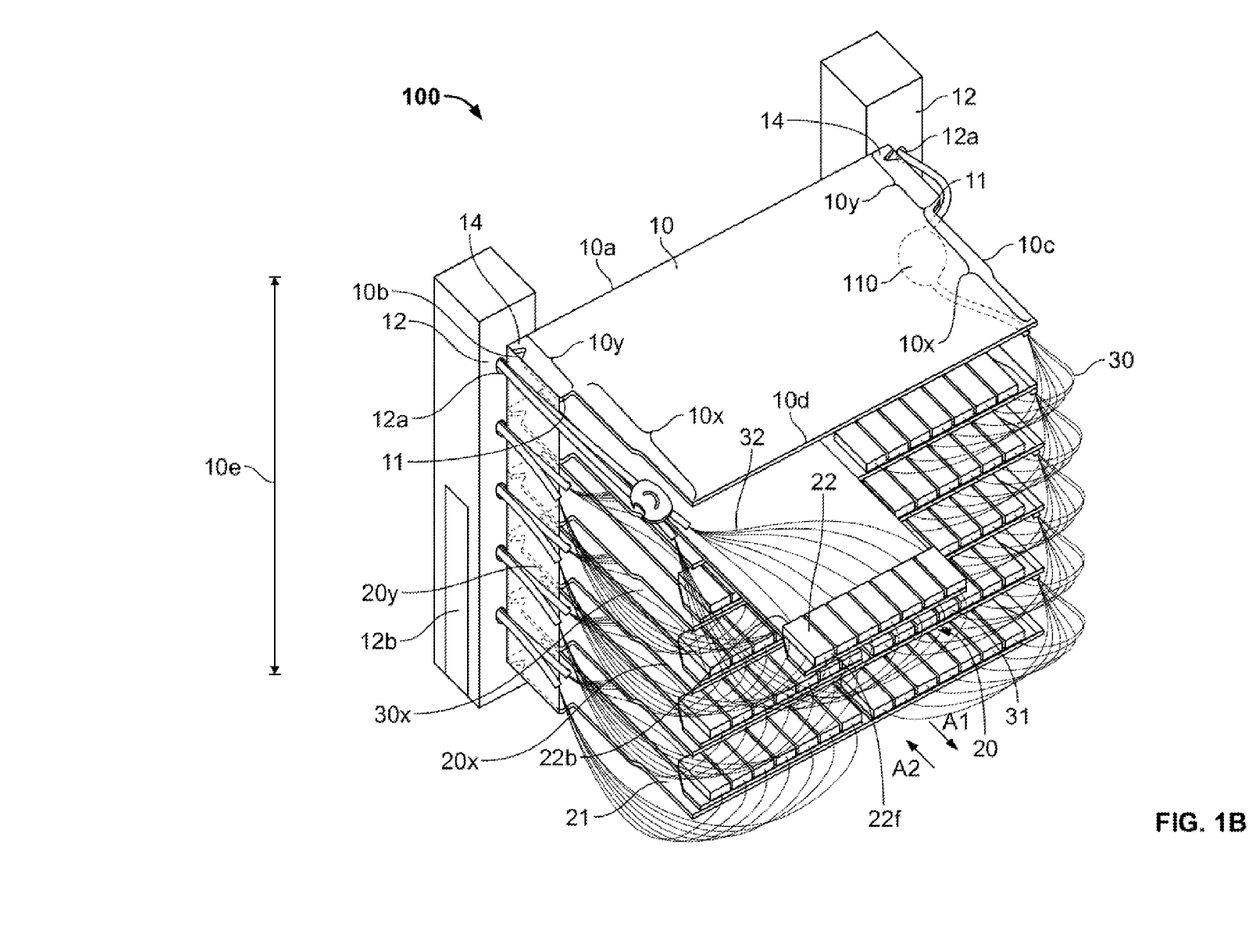
FIG. 1B is a perspective view of the communication patching system of FIG. 1A with a patch panel device having cables connected thereto pulled from the housing.
Figure 1C:
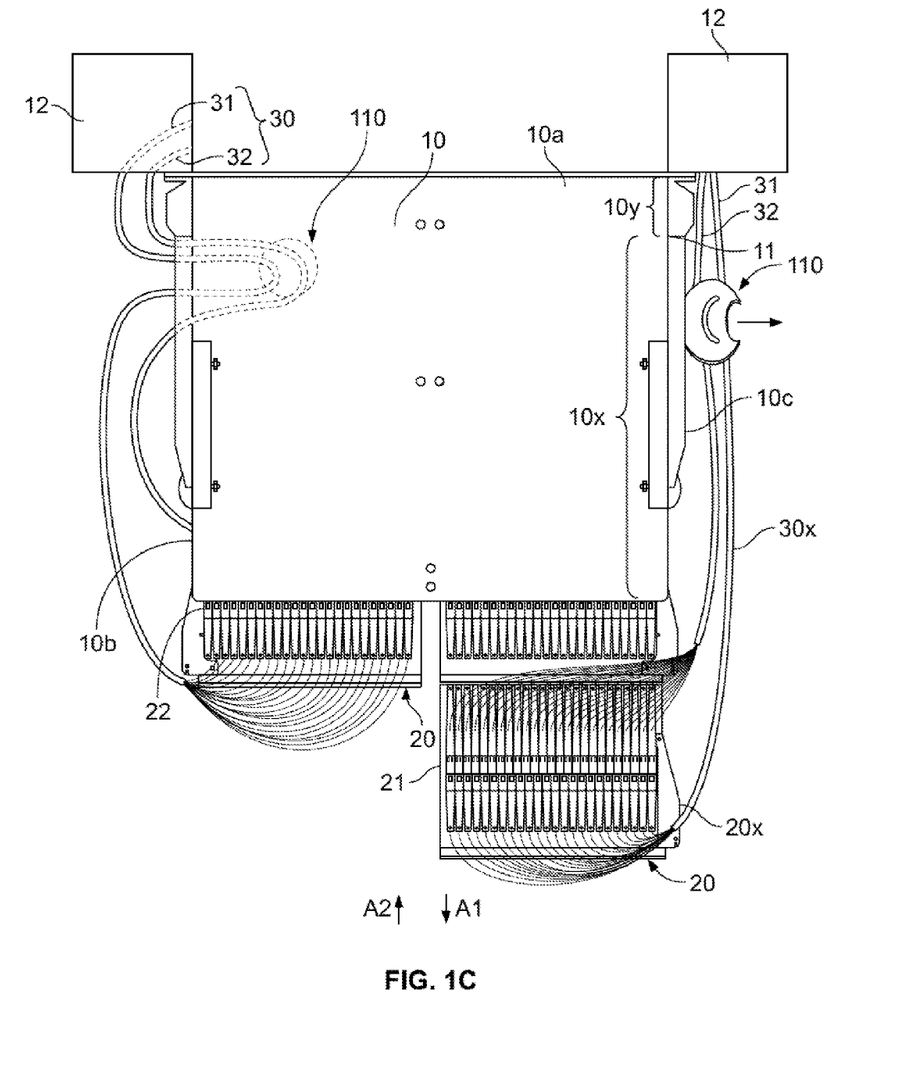
FIG. 1C is a top view of the communication patching system of FIG. 1B.

An exemplary communication patching system 100 will now be described with reference to FIG. 1A. The communication patching system 100 includes a housing 10, e.g., a chassis or a cabinet. The housing 10 may support one or more patch panel devices 20 and defines a back side 10a, a left side 10b, a right side 10c, a front side 10d, and a height 10e. Left side 10b and right side 10c of housing 10 may be substantially open, thereby separating the sides into open and closed portions 10x, 10y, respectively. Referring to FIGS. 1B and 1C, the closed portion 10y may extend from the back side 10a to a point 11 along the left or right side 10b, 10c and the open portion 10x may be defined by the point 11 to the front side 10d. The location of the point 11 along the left or right sides 10b, 10c is selected such that a cable guide 110, which is coupled to a corresponding patch panel device 20, may transition between a first state, in which the guide 110 projects from the right or left side 10b, 10c of the housing 10, and a second state, in which the guide 110 is retracted into the housing 10 so as to not project from the left or right side 10b, 10c of the housing 10. It is further envisioned that an alternative embodiment of the housing 10 may not include a closed portion 10y, such that an open portion 10x extends from the front to the back sides 10d, 10a of the housing 10.

Each patch panel device 20 supported within the housing 10 may similarly have proximal and distal portions 20x, 20y, which may align, respectively, with the open and closed portions 10x, 10y of the housing 10 when the device 20 is completely stored in the housing 10. Each device 20 may be slidably supported within the housing 10, which arranges the devices 20 in a vertically-aligned stack with one device 20 stacked on top of another. A plurality of shelves (not shown) may be disposed within the housing 10 to provide added support to each device 20. Each patch panel device 20 may thus be translated in a proximal direction A1 away from, or a distal direction A2 toward, the back side 10a of the housing 10.

Referring to FIGS. 1B and 1C, each patch panel device 20 may include a tray 21 and a plurality of adapters 22 mounted to the tray 21 and be configured to be operatively connected to cables 30, which may include front cables 31 and back cables 32. Front cables 31 and back cables 32 may be substantially the same cables 30, but are distinguished from each other herein to specify their positioning relative to adapter 22 when connected thereto. Each adapter 22 may include a front end 22f, which may be operatively connected to one of the front cables 31, and a back end 22b, which may be operatively connected to one of the back cables 32.

For each patch panel device 20, the front and back cables 31, 32 may be coupled to a corresponding cable guide 110. The cable guide 110 may be operatively coupled to the housing 10 and the corresponding patch panel device 20 so as to be positioned along the left or right sides 10b, 10c of the housing 10. The guides 110 may translate so as to project from the left or right sides 10b, 10c of the housing 10 when the trays 21 are translated in a proximal or a distal direction A1, A2 toward or away from the back side 10a of the housing 10. Thus, portions of the cables 30 coupled to, and extending away from, the guide 110 may correspondingly project from the left or right sides 10b, 10c of the housing 10 based on the translation of the guide 110. As the patch panel device 20 is withdrawn from the housing 10 in direction A1 (see FIGS. 1B and 1C), the adapters 22 may also become fully exposed to enhance the accessibility of back cables 32 at the adapters, so as to permit ease of detachment, connection, or manipulation of the back cables 32.

One or more poles 12 may be disposed adjacent a corner 14 of the back side 10a and either the left or right sides 10b, 10c of the housing 10. Each pole 12 may be substantially hollow and configured to receive cables 30 extending from the patch panel devices 20 through a plurality of apertures 12a disposed along its length. The pole 12 may span the entire height 10e of the housing 10 in order to accommodate the cables 30 extending from an entire stack of patch panel devices 20. The pole 12 may also include a door 12b to provide convenient access to the cables 30 stored within (see FIG. 1B).

Figure 1D:
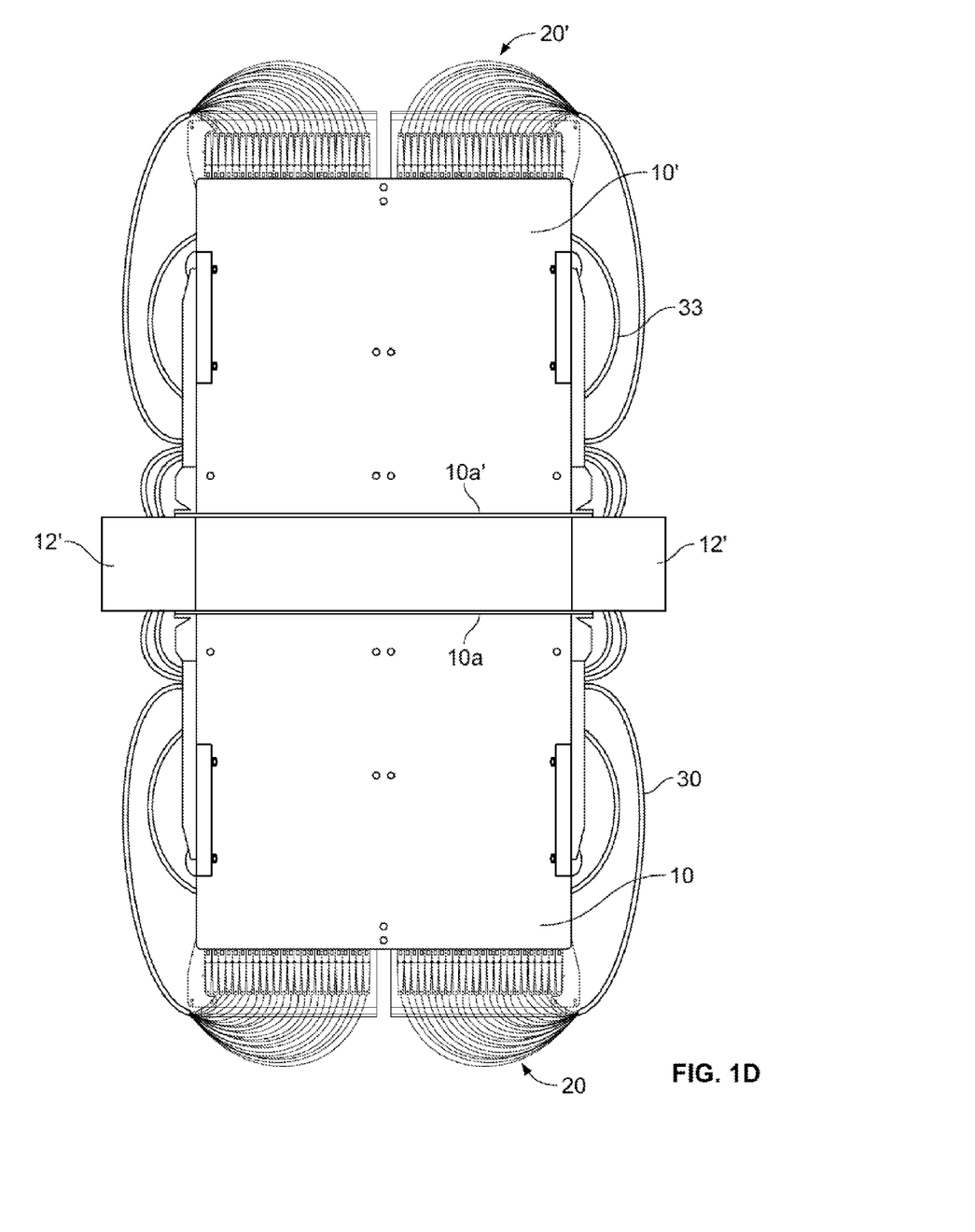
FIG. 1D is a top view of two of the communication patching systems of FIG. 1A in a back-to-back configuration.

Because the left and right sides 10b, 10c of the housing 10 may be substantially open, a length 30x of cables 30 may be exposed outside of housing 10, along the left or right sides 10b, 10c of the housing 10 and extend through an aperture 12a into the interior of the pole 12. Advantageously, the accessibility of the lengths 30x from the left or right sides 10b, 10c of housing 10 greatly reduces the necessity of accessing the interior and/or back side 10a of the housing 10 for installing or uninstalling cables 30 because the cables 30 instead may be easily manipulated and/or accessed via the left or right sides 10b, 10c of housing 10. Further, the accessibility of the lengths 30x of cables 30 at the left and right sides 10b, 10c of the housing 10 permits that multiple housings 10 may be positioned relative to one another in configurations that would otherwise be impractical, including configurations in which access to the back side 10a of a housing 10 is eliminated and multiple housings may share the same pole 12'. As shown in FIG. 1D, first and second housings 10, 10' may be positioned with their respective back sides 10a, 10a' facing each other and coupled to one or more poles 12' disposed therebetween, such that cables 30, 33 coupled to the patch panel devices 20, 20' within housings 10, 10', respectively, may share a single pole 12'.

Figure 2A:
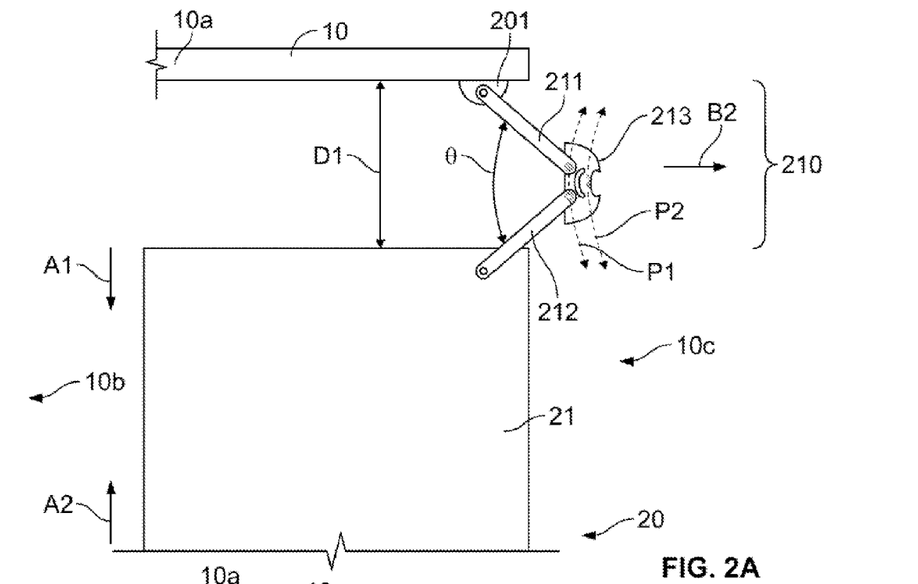
FIG. 2A is a top view of a cable guide shown in a first state relative to a housing and a patch panel device of the communication patching system of FIG. 1A.
Figure 2B:
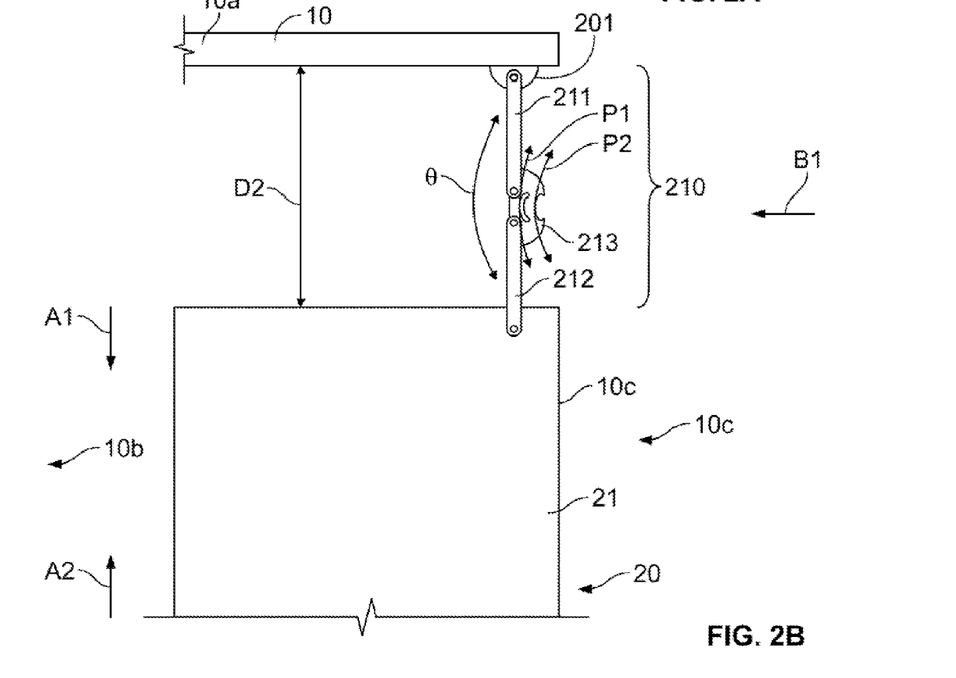
FIG. 2B is a top view of the cable guide of FIG. 2A shown in a second state.

A guide 210 for managing cables is described with reference to FIGS. 2A and 2B. Cable guide 210 may be adapted to any communication patching system, including the patching system 100 described above, and is transitionable between a first state (FIG. 2A) and a second state (FIG. 2B). The cable guide 210 may be operatively coupled to a housing 10 and a patch panel device 20, and may be disposed along the left or right sides 10b, 10c of the housing 10. Cable guide 210 may include a first member 211, a second member 212, and a guide member 213. Cables 30 (not shown) may be received by the guide member 213 such that translation of the guide member 213 causes a corresponding translation of portions of the cables 30 at and extending from the guide member 213. Guide member 213 may define a first path P1 and a second path P2 along which cables 30 may extend to the adapters 22 (not shown), where the back cables 32 (not shown) may follow the first path P1 and the front cables 31 (not shown) may follow the second path P2.

First member 211 of cable guide 210 may be secured to the back side 10a of housing 10. For example, a tab 201 may be secured to back side 10a of housing 10 via any suitable connection means such as, for example, by a weld. First member 211 may be pivotably secured to back side 10a of housing 10 and may be pivotably secured to the guide member 213, whereas second member 212 may be pivotably secured to the tray 21 of patch panel device 20 and may be pivotably secured to guide member 213. Thus, the first and second members 211, 212 may pivot toward or away from one another in a scissor-like fashion at the guide member 213.

In particular, first and second members 211, 212 may define an angle θ therebetween. Angle θ between first and second members 211, 212 may be transitionable in a range from approximately 0 to 180 degrees in response to translation of tray 21 relative to back side 10a of housing 10 in a proximal or distal direction A1, A2. As the first and second members 211, 212 pivot towards one another, angle θ is decreased and tray 21 may be spaced a distance D1 from back side 10a of housing 10, thereby translating the guide member 210 at least partially beyond the right side 10c of the housing 10 in direction B2. As the tray 21 is extended a maximum distance D2 away from the back side of housing 10a, angle θ approaches 180 degrees, thereby retracting the guide member 210 into the interior of the housing 10 in direction B1.

Figure 3A:
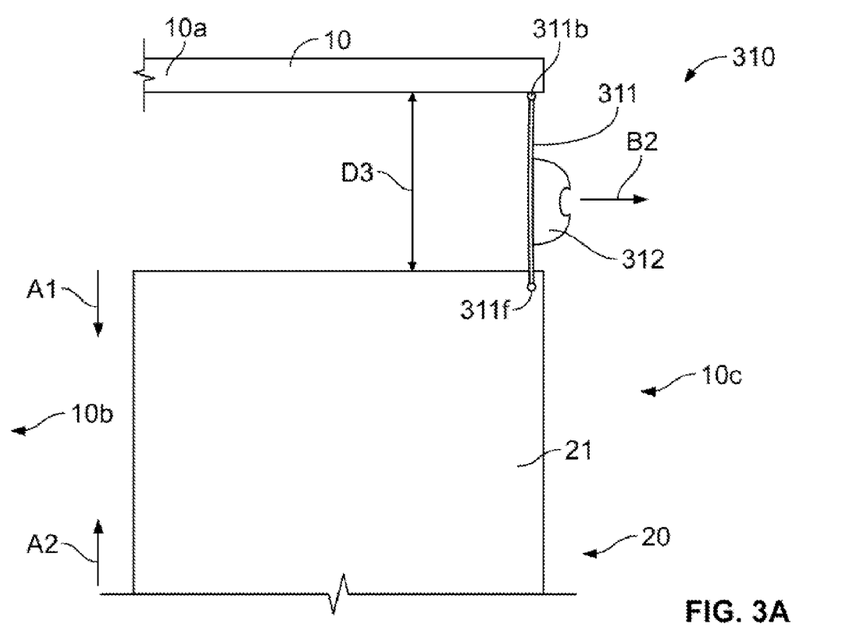
FIG. 3A is a top view of another embodiment of a cable guide shown in a first state relative to a housing and a patch panel device of the communication patching system of FIG. 1A.
Figure 3B:
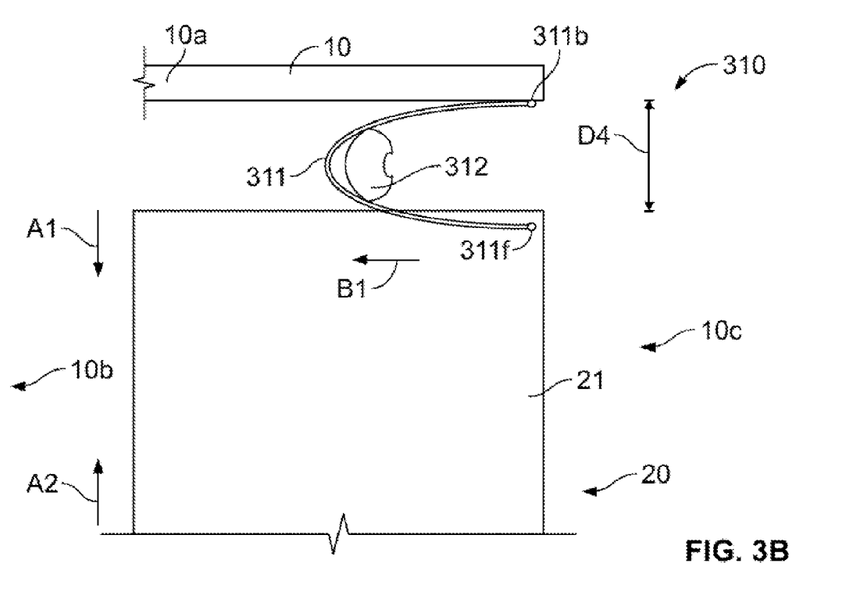
FIG. 3B is a top view of the cable guide of FIG. 3A shown in a second state.

In another embodiment, a cable guide 310, as shown in FIGS. 3A and 3B, may include a bendable strip 311 and cable securing member 312 to which cables 30 (not shown) may be secured. Bendable strip 311 may be formed from any suitable material capable of being bent, and includes a front end 311f secured to tray 21 and a back end 311b secured to back side 10a of housing 10. Both the front and back ends 311f, 311b may be pivotably secured to the tray 21 and back side 10a of the housing 10, respectively, to facilitate translation of the tray 21 toward or away from the back side 10a of the housing 10 in the proximal or distal directions A1, A2.

As shown in FIG. 3A, when tray 21 is spaced from back side 10a of housing 10 by distance D3, bendable strip 311 is substantially straight. As shown in FIG. 3B, when tray 21 is spaced from back side 10a of housing 10 by a distance D4, which is less than the distance D3, bendable strip 311 is bent or curved.

When tray 21 is translated in a direction away from back side 10a of housing 10, bendable strip 311 straightens and translates in a direction B2, toward the adjacent right side 10c of the housing 10, such that the member 312 at least partially extends past the right side 10c. Accordingly, the securing member 312 may cause an increasing length 30x of the cables 30 (not shown) to become disposed outside the housing 10 as the tray 21 is pulled away from the back side 10a of the housing 10.

Referring to FIG. 3B, when the tray 21 is translated in a distal direction A2 toward back side 10a of housing 10, bendable strip 311 bends and translates in a direction B1, away from adjacent right side 10c and toward opposing left side 10b of the housing 10, such that the member 312 is substantially or entirely retracted into the interior of the housing 10. Accordingly, the portions of the cables 30 secured to and extending from the member 312 are retracted therewith and become substantially or entirely disposed within the interior of the housing 10 as the tray 21 is pushed toward the back side 10a of the housing 10.

Both cable guides 210, 310 may be configured in a communication patching system to drive cables 30 attached thereto in directions B1 or B2, thereby extending lengths 30x of the cables 30 beyond the left or right sides 10b, 10c of the housing 10 when tray 21 of patch panel device 20 is translated a sufficient distance toward or away from the back side 10a of the housing 10, and retracting the lengths 30x of the cables 30 into the interior of the housing 10 when the tray 21 is translated in a proximal or distal direction A1, A2 toward or away from the back side 10a of the housing 10.

Another embodiment of a communication patching system 100a is shown and described with reference to FIGS. 4A and 4B. Communication patching system 100a may include a housing 10 and patch panel device 20 as described above and further include a cable retraction or guiding mechanism 410. Tray 21 of patch panel device 20 may be slidably coupled to a track 13 mounted within housing 10 and may be translatable in a proximal or distal direction A1, A2. Housing 10 may also be coupled to poles 12 (not shown) such that a length 30x of cables 30 disposed beyond the left or right sides 10b, 10c of housing 10 may be disposed within the poles 12.

Guiding mechanism 410 may include an arm member 411 which may be pivotably secured to tray 21 and slidably secured within a groove 412a of a track 412 secured at or near back side 10a of housing 10. A securing member 414 having an end 414a may be disposed on the arm member 411. Arm member 411 may include a first section 411a and a second section 411b. The first and second sections 411a, 411b may define an angle therebetween. First section 411a may be pivotably secured to tray 21 via a pin 413a and second section 411b may include a groove 411c defined along a length of the second section 411b. A pin 413b may operatively couple second section 411b of arm member 411 to the track 412, where the pin 413b is translatable along the length of groove 412a and along the length of groove 411c of the arm member 411. Groove 412a may be curved substantially towards the left or right side 10b, 10c of the housing 10 to facilitate translation of section 411b of the arm member 411 along the length of the groove 412a towards the left or right side 10b, 10c during translation of the tray 21 in the proximal or distal directions A1, A2.

Figure 4A:
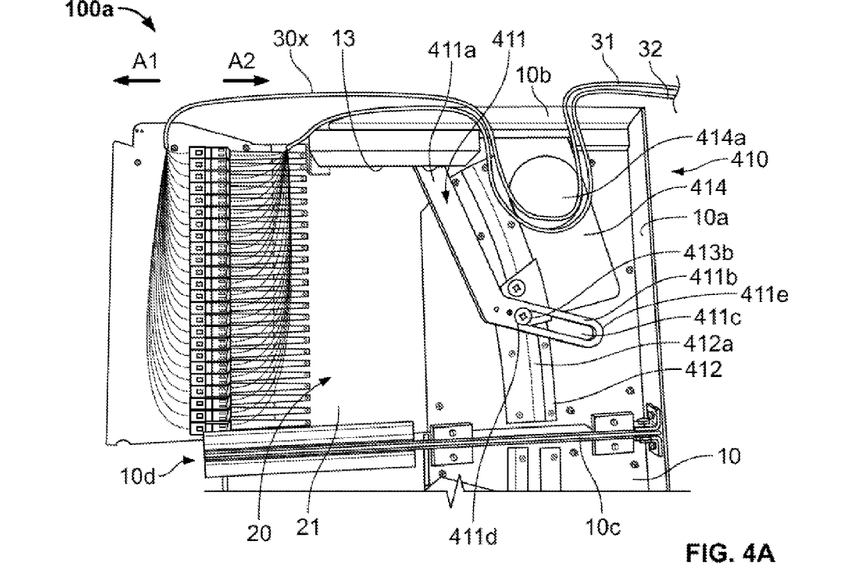
FIG. 4A is a top view of another embodiment of a communication patching system having a cable guiding mechanism in a first state.
Figure 4B:
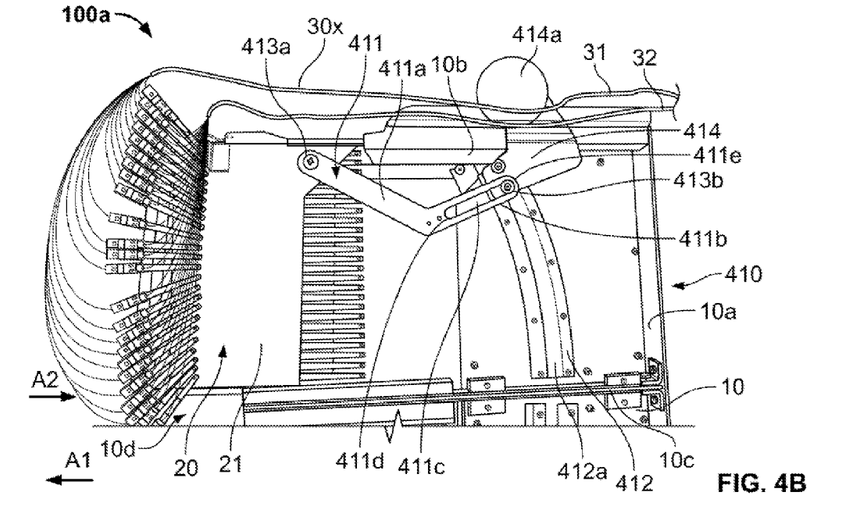
FIG. 4B is a top view of the communication patching system of FIG. 4A having the cable guiding mechanism in a second state.

Referring to FIGS. 4A and 4B, as tray 21 is translated in a proximal direction A1 away from the back side 10a of housing 10, first section 411a may pivot about the tray 21 toward the left or right side 10b, 10c of the housing 10 and pin 413b may translate from first end 411d of groove 411c (see FIG. 4A) toward second end 411e of the groove 411c (see FIG. 4B), while the pin 413b translates the second section 411b along the length of groove 412a, toward the left or right sides 10b, 10c of the housing 10. As arm member 411 translates along the length of groove 412a, the securing member 414 may correspondingly translate towards the left or right sides 10b, 10c, thereby translating lengths 30x of cables 30 which may be secured thereto at end 414a. As the sides of housing 10b, 10c may be substantially open, the lengths 30x of cables 30 at and extending from the securing member 414 may transition from the interior of housing 10 to at least partially external the left or right side 10b, 10c by translation of the securing member 414 towards, and desirably through, the sides 10b, 10c (see FIG. 4B).

In addition, when the tray 21 is translated in distal direction A2 toward the back side 10a of the housing 10, first section 411a may pivot about the tray 21 away from the left or right side 10b, 10c of the housing 10 and pin 413b may translate from second end 411e of the groove 411c (see FIG. 4B) toward first end 411d of groove 411c (see FIG. 4A), while the pin 413b translates the second section 411b along the length of groove 412a away from the left or right side 10b, 10c of the housing 10. The securing member 414 may correspondingly retract from outside the left or right sides 10b, 10c back into the housing 10, thereby translating the lengths 30x of the cables 30 secured thereto at end 414a into the housing 10 as well.

In any of the embodiments described herein, it is to be understood that any suitable connector may be used. For example, an LC connector is one example of a small-form connector that may be used. Differently sized connectors, whether larger or smaller may also be used. As discussed above, connectors may be configured to be coupled to one or more cables, e.g., simplex or duplex. Specific connectors shown and described herein are merely illustrative embodiments. Connectors that are differently configured and/or sized may be utilized without deviating from the scope and spirit of the present invention.

Although the invention herein has been described with reference to particular embodiments, it is to be understood that these embodiments are merely illustrative of the principles and applications of the present invention. It is to be understood unless otherwise indicated herein that the figures are not intended to be to scale. It is therefore to be understood that numerous modifications may be made to the illustrative embodiments and that other arrangements may be devised without departing from the spirit and scope of the present invention as defined by the appended claims.

The invention claimed is:

1. A cable guide for guidance of at least one cable through a communication patch panel system, the system including a housing having front and back sides and left and right sides, and at least one patch panel device including a tray and one or more adapters, the cable guide comprising:
    an advancing member having:
        a first end for coupling to the back side of the housing;
        a second end for coupling to the tray of the patch panel device; and
        a guide member disposed between the first and second ends,
    wherein the advancing member is transitionable between a first state and a second state;
    wherein, when the first and second ends are coupled respectively to the back side and the tray in an installed state:
        in the first state, the guide member is positioned at least partially external to the housing at one of the left or right sides; and
        in the second state, the guide member is positioned within the housing,
        in which the guide member translates across the one of the left or right sides of the housing by moving towards the one of the left or right sides of the housing, when the advancing member transitions from one of the first state and the second state to the other of the first state and the second state.

2. The cable guide of claim 1, wherein the advancing member comprises a bendable member;
    wherein the guide member is disposed on one of left or right sides of the bendable member;
    wherein, in the installed state:
        in the first state, the patch panel device is positioned at least a first distance from the back side of the housing, and
        in the second state, the patch panel device is positioned no more than the first distance from the back side of the housing.

3. The cable guide of claim 1, wherein the advancing member further comprises a first member and a second member;
    wherein first ends of the first and second members are for pivotably coupling to the back side of the housing and the tray of the patch panel device, respectively; and
    wherein second ends of the first and second members are pivotably coupled to the guide member.

4. The cable guide of claim 1, wherein, in the installed state, the advancing member transitions into the first state from the second state as the tray is translated away from the back side of the housing.

5. The cable guide of claim 1, wherein the guide member further comprises first and second paths to which a length of the at least one cable may be coupled.

6. A cable guide for guidance of at least one cable through a communication patch panel system, the system including a housing having front and back sides and left and right sides, and at least one patch panel device including a tray and one or more adapters, the cable guide comprising:
    an arm member including a first section and a second section, the first section for pivotably coupling to the tray; and
    a track for mounting within the housing, the track including a groove extending along the track, the second section for slidably coupling to the track such that the second section is translatable along the groove; and
    a securing member coupled to the arm member,
    wherein the arm member is translatable between a first and a second state;
    wherein, in an installed state where the first section is pivotably coupled to the tray and the second section is slidably coupled to the track:
        in the first state, the securing member is positioned at least partially external to one of the left or right sides of the housing; and
        in the second state, the securing member is positioned within the housing,
        in which the securing member translates across the one of the left or right sides of the housing by moving towards the one of the left or right sides of the housing, when the arm member transitions from one of the first state and the second state to the other of the first state and the second state.

7. The cable guide of claim 6, wherein, in the installed state, the first section pivots toward one of the left or right sides when the arm member translates from the second state to the first state.

8. The cable guide of claim 6, wherein, in the installed state, the second section translates along the groove of the track when the arm member translates from the second state to the first state.

9. The cable guide of claim 6, wherein the second section of the arm member further includes an arm groove having a first end and a second end, and wherein the arm groove is slidably coupled to the groove of the track by a groove pin.

10. The cable guide of claim 9, wherein the second section translates from the first end to the second end of the arm groove when the arm member translates from the second state to the first state.

11. The cable guide of claim 6, wherein, in the installed state:

in the first state, the patch panel device is positioned at least a first distance from the back side of the housing, and in the second state, the patch panel device is positioned no more than the first distance from the back side of the housing.

* * * * *